United States Patent
Singh et al.

(10) Patent No.: US 11,131,993 B2
(45) Date of Patent: Sep. 28, 2021

(54) METHODS AND SYSTEMS FOR TRAJECTORY FORECASTING WITH RECURRENT NEURAL NETWORKS USING INERTIAL BEHAVIORAL ROLLOUT

(71) Applicant: Argo AI, LLC, Pittsburgh, PA (US)

(72) Inventors: Jagjeet Singh, Pittsburgh, PA (US); Andrew T. Hartnett, Pittsburgh, PA (US); G. Peter K. Carr, Allison Park, PA (US); Slawomir W. Bak, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 275 days.

(21) Appl. No.: 16/425,132

(22) Filed: May 29, 2019

(65) Prior Publication Data

US 2020/0379461 A1    Dec. 3, 2020

(51) Int. Cl.
*G06N 3/08* (2006.01)
*G05D 1/00* (2006.01)
*G05D 1/02* (2020.01)
*B60W 50/00* (2006.01)

(52) U.S. Cl.
CPC ....... *G05D 1/0088* (2013.01); *B60W 50/0097* (2013.01); *G05D 1/0221* (2013.01); *B60W 2554/00* (2020.02); *G05D 2201/0213* (2013.01)

(58) Field of Classification Search
CPC . G05D 1/00; G05D 1/02; B62D 15/02; G06T 7/246; G06N 5/02
See application file for complete search history.

(56) References Cited

U.S. PATENT DOCUMENTS

| | | | |
|---|---|---|---|
| 9,120,484 | B1 | 9/2015 | Ferguson et al. |
| 9,248,834 | B1 | 2/2016 | Ferguson et al. |
| 9,630,318 | B2 | 4/2017 | Gabardos et al. |
| 10,055,850 | B2 | 8/2018 | Piekniewski et al. |

(Continued)

FOREIGN PATENT DOCUMENTS

KR    20180128670 A    12/2018

OTHER PUBLICATIONS

Levinson, Jesse et al., "Towards Fully Autonomous Driving: Systems and Algorithms", 2011 IEEE Intelligent Vehicles Symposium (IV), Jun. 5-9, 2011.

(Continued)

*Primary Examiner* — Yuri Kan
(74) *Attorney, Agent, or Firm* — Fox Rothschild LLP

(57) ABSTRACT

A method and a system for forecasting trajectories in an autonomous vehicle using recurrent neural networks. The method includes receiving a first set of data that comprises time series information corresponding to states of a plurality of objects, analyzing the first set of data to determine a plurality of object trajectory sequences corresponding to the plurality of objects, and using one or more of the plurality of object trajectory sequences as input to train a prediction model for predicting future trajectories of the plurality of objects. The predication model can be trained by defining a first prediction horizon, training the prediction model over the first prediction horizon to generate a semi-trained prediction model, defining a second prediction horizon that is longer than the first prediction horizon, and training the semi-trained prediction model to generate a trained prediction model.

30 Claims, 9 Drawing Sheets

(56) References Cited

U.S. PATENT DOCUMENTS

| | | | |
|---|---|---|---|
| 2013/0054106 A1* | 2/2013 | Schmudderich | G06K 9/00805 701/96 |
| 2018/0053108 A1 | 2/2018 | Olabiyi et al. | |
| 2018/0158197 A1 | 6/2018 | Dasgupta et al. | |
| 2018/0173240 A1 | 6/2018 | Fang et al. | |
| 2018/0304889 A1 | 10/2018 | Shalev-Shwartz et al. | |
| 2018/0321686 A1 | 11/2018 | Kanzawa et al. | |
| 2018/0374359 A1 | 12/2018 | Li et al. | |
| 2019/0025841 A1 | 1/2019 | Haynes et al. | |
| 2019/0049970 A1* | 2/2019 | Djuric | G06N 20/00 |
| 2019/0049987 A1* | 2/2019 | Djuric | G06K 9/6288 |
| 2019/0071124 A1* | 3/2019 | Carter | B62D 15/023 |
| 2019/0354105 A1* | 11/2019 | Cunningham | G05D 1/0212 |
| 2020/0159225 A1* | 5/2020 | Zeng | G05D 1/0088 |
| 2021/0056713 A1* | 2/2021 | Rangesh | G06K 9/6267 |

OTHER PUBLICATIONS

Galceran, Enric et al., "Augmented Vehicle Tracking under Occlusions for Decision-Making in Autonomous Driving", 2015 IEEE/RSJ International Conference on Intelligent Robots and Systems (IROS), Sep. 2015.

Chang, Ming-Fang et al., "Argoverse: 3D Tracking and Forecasting with Rich Maps", Jun. 19, 2019.

Lee, Namhoon et al., DESIRE: Distant Future Prediction in Dynamic Scenes with Interacting Agents, Computer Science: Computer Vision and Pattern Recognition, Apr. 14, 2017.

Deo, N. et al., "Convolutional Social Pooling for Vehicle Trajectory Prediction", cs.CV, May 15, 2018.

Bansal, Mayank et al., "ChauffeurNet: Leaning to Drive by Imitating the Best and Synthesizing the Worst", Computer Science: Robotics, Dec. 7, 2018.

Casas, Sergio et al., "IntentNet: Learning to Predict Intention from Raw Sensor Data", Proceedings of the 2nd Conference on Robot Learning, PMLR 87:947-956, 2018.

\* cited by examiner

METHODS AND SYSTEMS FOR TRAJECTORY FORECASTING WITH RECURRENT NEURAL NETWORKS USING INERTIAL BEHAVIORAL ROLLOUT

BACKGROUND

Successful design and deployment of autonomous vehicles (AV) requires the ability to accurately forecast future trajectories of agents around the AV because control decisions must be made with respect to the future state of the AV's environment. Such agents may include stationary or moving vehicles, objects, people, etc. in the environment of the AV. Various AV systems monitor the surroundings of the AV, decide whether collision with an agent can occur, and maneuver the AV to avoid a collision. Typically, forecasting the trajectory of an agent includes a structured (sequential) prediction analysis by learning a model for behavior from a data set of example trajectories—such as a data set of manually driven or observed trajectories. Examples of such learning include imitation learning, inverse reinforcement learning, and learning to search.

Existing learning methods have inherent limitations that require initialization with good starting parameters. Furthermore, such methods ignore the underlying issue that sequential prediction for trajectory forecasting is based on non-identical and non-independent (non-i.i.d.) data where the learned policy influences the distribution of states over which it is predicted that results in compounding of errors. As such, current learning methods do not take into account both highly structured physical environments (e.g., a road networks) and the large number of interacting agents that influence trajectory forecasting of an AV.

This document describes methods and systems that are directed to addressing the problems described above, and/or other issues.

SUMMARY

In one or more scenarios, methods and systems for forecasting trajectories in an autonomous vehicle using recurrent neural networks are disclosed. The system may include an autonomous vehicle comprising one or more sensors, a processor, and a non-transitory computer readable medium comprising one or more programming instructions. The processor may execute the programming instructions to perform the methods of this disclosure. In one or more aspects, the method may include receiving a first set of data, analyzing the first set of data to determine a plurality of object trajectory sequences corresponding to a plurality of objects, and using one or more of the plurality of object trajectory sequences as input to train a prediction model for predicting future trajectories of the plurality of objects. The first set of data may include time series information corresponding to states of the plurality of objects. Training the prediction model may include defining a first prediction horizon, training the prediction model over the first prediction horizon to generate a semi-trained prediction model, defining a second prediction horizon that is longer than the first prediction horizon, and training the semi-trained prediction model to generate a trained prediction model.

In one or more embodiments, the method may also include using the trained prediction model to predict future trajectories of one or more objects based on observed states of the one or more objects.

In certain embodiments, the method may further include generating a planned trajectory for an autonomous vehicle by: receiving state data corresponding to the autonomous vehicle, receiving perception data corresponding to one or more objects in an environment of the autonomous vehicle, inputting the perception data into the trained prediction model to predict future trajectories of the one or more objects, and inputting the state data corresponding to the autonomous vehicle and each of the predicted future trajectories into the trained prediction model to generate a planned trajectory for the autonomous vehicle.

In at least some embodiments, the method may also include using one or more of the plurality of object trajectory sequences as input to train the prediction model for predicting future trajectories of the plurality of objects by defining a third prediction horizon that is longer that the second prediction horizon, training the trained prediction model to generate an updated trained prediction model.

Optionally, the first prediction horizon may be determined to train the prediction model to encode one or more inertial constraints for predicting future trajectories of the plurality of objects. The first prediction horizon may be less than 1 second. Additionally and/or alternatively, the second prediction horizon may be determined to train the prediction model to encode one or more behavioral constraints for predicting future trajectories of the plurality of objects. The second prediction horizon may be about 2 seconds to about 10 seconds.

In certain embodiments, the method may also include determining a reference path for each of the plurality of object trajectory sequences, and transforming each of the plurality of object trajectory sequences into a curvilinear coordinate system with respect to the corresponding reference path. Optionally, the reference path may be encoded in a vector map that comprises information corresponding to a plurality of semantic attributes. In some embodiments, the information corresponding to the plurality of semantic attributes may include, for example and without limitation, information relating to whether a lane is located within an intersection, information relating to whether a lane has an associated traffic control measure, a lane's turn direction (left, right, or none), one or more unique identifiers for a lane's predecessors, and/or one or more unique identifiers for a lane's successors. The reference path may be a centerline of a lane.

In one or more embodiments, the method may also include encoding social context information of each of the plurality of objects into the corresponding object trajectory, where the social context information may include, for example, minimum distance to one or more objects in front of that object, minimum distance to one or more objects behind that object, and/or a number of neighboring objects.

In certain embodiments, the prediction model may be a recurrent neural network (RNN).

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
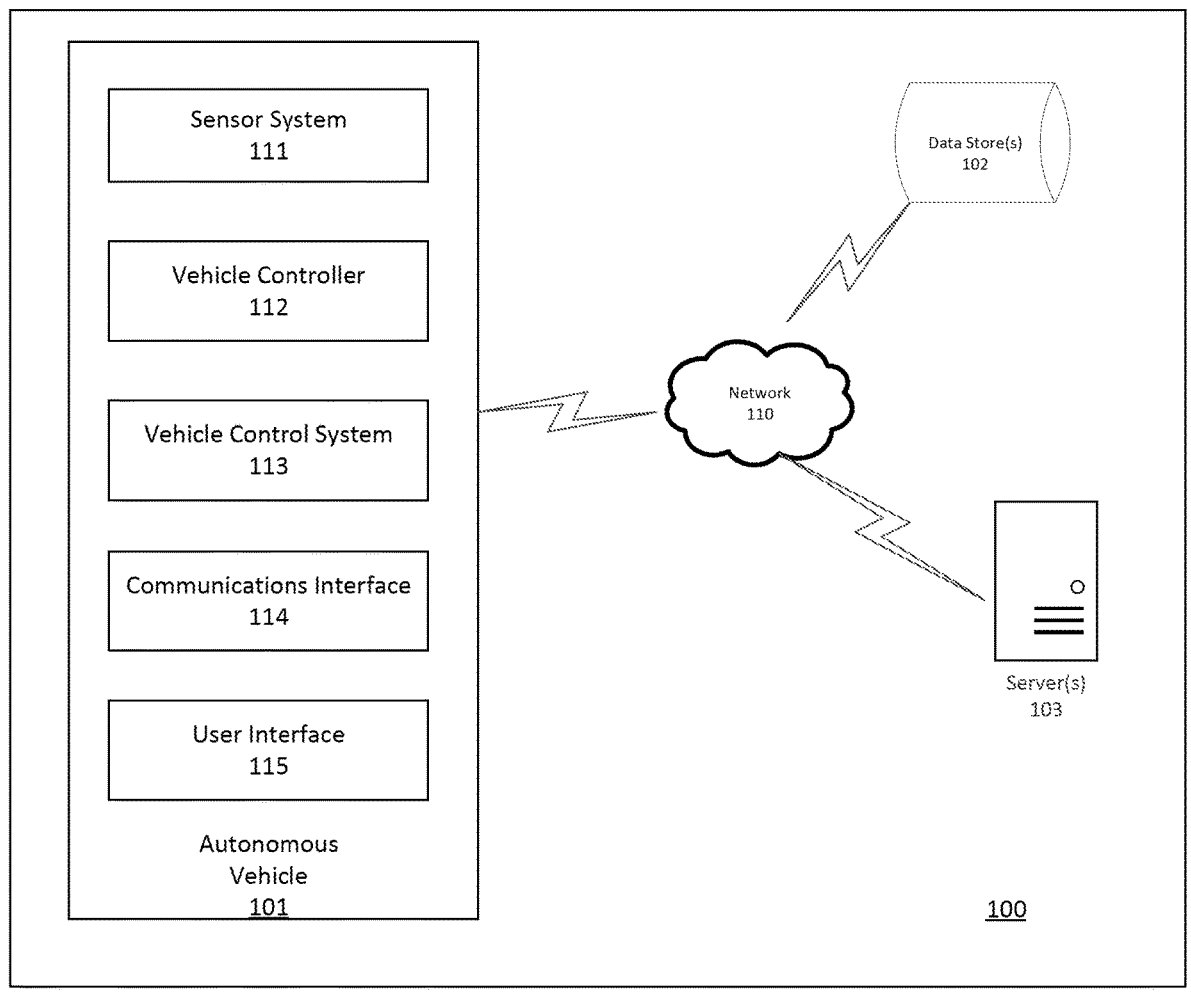
FIG. 1 illustrates an example system that includes an autonomous vehicle.

FIG. 1 is a block diagram illustrating an example system 100 that includes an autonomous vehicle 101 in communication with one or more databases 102 and/or one or more servers 103 via a network 110. Although there is one autonomous vehicle shown, multiple autonomous vehicles may be coupled to each other and/or coupled to databases 102 and/or servers 103 over network 110. Network 110 may be any type of network such as a local area network (LAN), a wide area network (WAN) such as the Internet, a cellular network, a satellite network, or a combination thereof, and may be wired or wireless. Database(s) 102 may be any kind of databases such as, without limitation, map databases, traffic information databases, user information databases, point of interest database(s), or any other type of content database(s). Server(s) 103 may be any kind of servers or a cluster of servers, such as, without limitation, Web or cloud servers, application servers, backend servers, or a combination thereof.

As illustrated in FIG. 1, the autonomous vehicle 101 may include a sensor system 111, a vehicle controller 112, a vehicle control system 113, a communications interface 114, and a user interface 115. Autonomous vehicle 101 may further include certain components (not shown here) included in vehicles, such as, an engine, wheels, steering wheel, transmission, etc., which may be controlled by vehicle control system 112 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the autonomous vehicle 101. Examples of such sensors include, without limitation, a Light Detection and Ranging (LiDAR) system, a Radio Detection and Ranging (RADAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 101, information about the environment itself, information about the motion of the autonomous vehicle 101, information about a route of the autonomous vehicle, or the like.

Figure 2:
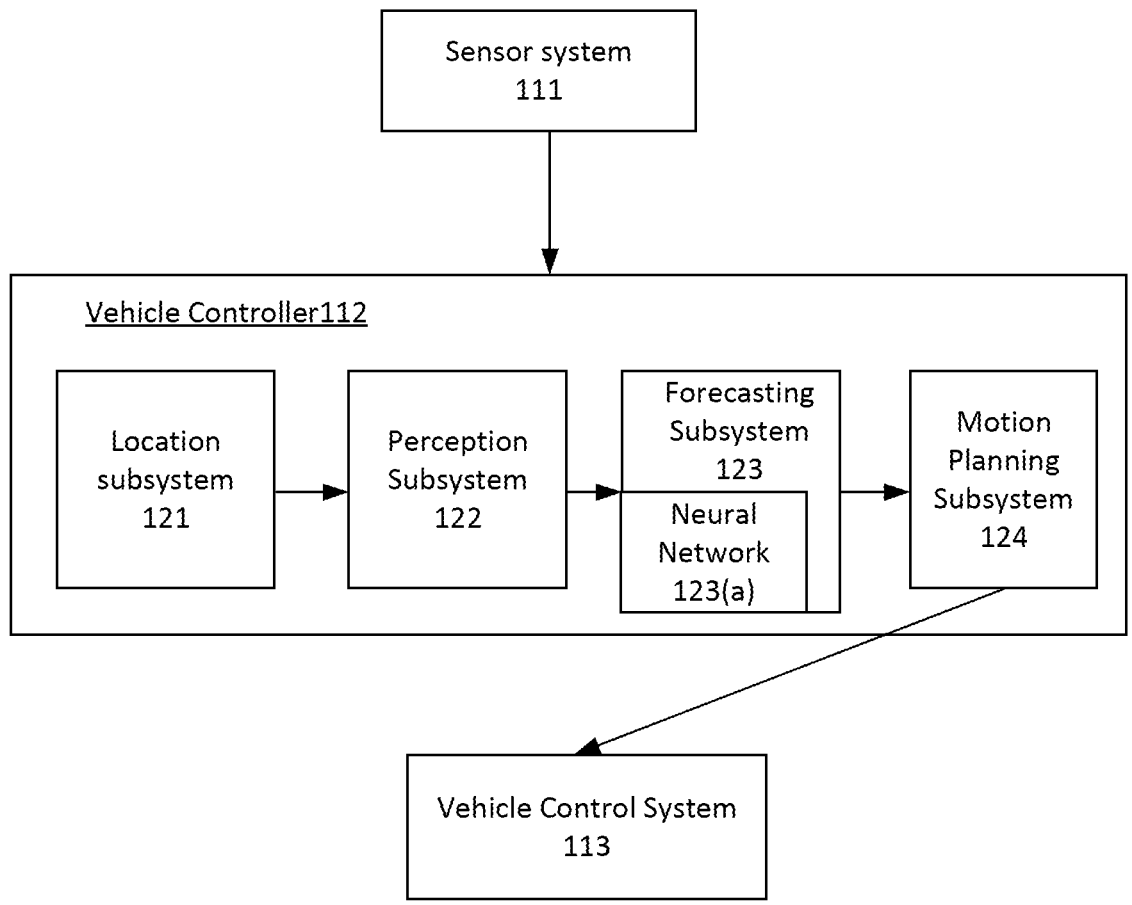
FIG. 2 illustrates block diagram of various components of an example controller of an autonomous vehicle.

As shown in FIG. 2, the vehicle controller 112 may receive data collected by the sensor system 111 and analyze it to provide one or more vehicle control instructions to the vehicle control system 113. The vehicle controller 112 may include, without limitation, a location subsystem 121, a perception subsystem 122, a forecasting and prediction subsystem 123, and a motion planning subsystem 124.

The location subsystem 121 may include and/or may retrieve map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle controller 112 in analyzing the surrounding environment of the autonomous vehicle. In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the location subsystem 121 may also include and/or may receive information relating to the trip or route of a user, real-time traffic information on the route, or the like.

Based on the sensor data provided by sensor system 111 and information obtained by the location subsystem 121, the perception subsystem 122 may determine perception information of the surrounding environment of the autonomous vehicle 101. The perception information may represent what an ordinary driver would perceive in the surrounding environment of a vehicle. The perception data may include information relating to one or more objects in the environment of the autonomous vehicle 101. For example, the perception subsystem 122 may process sensor data (e.g., LiDAR or RADAR data, camera images, etc.) in order to identify objects and/or features in the environment of autonomous vehicle. The objects may include traffic signals, road way boundaries, other vehicles, pedestrians, and/or obstacles, etc. The perception subsystem 122 may use any now or hereafter known object recognition algorithms, video tracking algorithms, and computer vision algorithms (e.g., track objects frame-to-frame iteratively over a number of time periods) to determine the perception.

In some embodiments, the perception subsystem 122 may also determine, for one or more identified objects in the environment, the current state of the object. The state information may include, without limitation, for each object: current location; current speed and/or acceleration, current heading; current orientation; size/footprint; type (e.g., vehicle vs. pedestrian vs. bicycle vs. static object or obstacle); and/or other state information.

The prediction and forecasting subsystem 123 may predict the future locations, trajectories, and/or actions of the objects based at least in part on perception information (e.g., the state data for each object) received from the perception subsystem 122, the location information received from the location subsystem 121, the sensor data, and/or any other data that describes the past and/or current state of the objects, the autonomous vehicle 101, the surrounding environment, and/or their relationship(s). For example, if an object is a vehicle and the current driving environment includes an intersection, prediction and forecasting subsystem 123 may predict whether the object will likely move straight forward or make a turn. If the perception data indicates that the intersection has no traffic light, prediction and forecasting subsystem 123 may also predict whether the vehicle may have to fully stop prior to enter the intersection. Such predictions may be made for a given time horizon (e.g., 5 seconds in the future).

The current disclosure describes systems and methods for using neural networks for improving the predictions performed by the prediction and forecasting subsystem 123, as described below. The neural network 123(a) may be included in the prediction and forecasting subsystem 123. Furthermore, the neural network 123(a) can be implemented in two phases: an offline training phase and an operational phase. The training phase is used to train and configure the parameters of the neural network 123(a) and/or any other components of the prediction and forecasting subsystem 123 implemented with a machine learning system or neural network. The operational phase is used after the neural network 123(a) has been trained and is ready to support the generation of predicted vehicle or object trajectories as described in more detail below. In certain embodiments, the neural network 123(a) may initially be trained at a server system outside the autonomous vehicle 101 and the trained neural network may be transmitted for storage in the prediction and forecasting subsystem 123. Alternatively, the neural network may be trained and stored outside the autonomous vehicle 101. In yet another embodiment, the neural network may be trained and stored on board the autonomous vehicle 101.

The improved ability to predict future object locations, trajectories, and/or actions can enable improved motion planning or other control of the autonomous vehicle 101 based on such predicted future object locations, trajectories, and/or actions. This analysis of the perception and context data enables the embodiments to accurately predict the behavior of proximate vehicles and objects for a context in which the host vehicle is operating.

For generating predictions and forecasting trajectories, the task for the model may be framed as: given the past input coordinates of a vehicle trajectory Vi as $Xi=(x^t_i, y^t_i)$ for time steps $t=\{1, \ldots, Tobs\}$, predict the future coordinates $Yi=(x^t_i, y^t_i)$ for time steps $\{t=Tobs+1, \ldots, Tpred\}$. As discussed below, the input coordinates of the trajectory are first converted to a curvilinear coordinate system before performing the training and generation of predictions and trajectory forecasts. Furthermore, for vehicles, typical driving maneuver last for about 4-5 seconds, and hence the time series are recorded and predicted over a time period of about 4-5 second. However, other time periods are within the scope of this disclosure.

In certain embodiments, the prediction and forecasting subsystem 123 may provide the predicted trajector(ies) for each object to the motion planning subsystem 124. The motion planning subsystem 124 may determine a motion plan for the autonomous vehicle based at least in part on the predicted trajector(ies) for each object. Specifically, given predictions about the future locations of proximate objects, the motion planning subsystem 124 can determine a motion plan for the autonomous vehicle 101 that best navigates the autonomous vehicle 101 relative to the objects at their future locations.

In one or more embodiments, the motion planning subsystem 124 may receive the predictions from the prediction and forecasting subsystem 123 and make a decision regarding how to handle objects in the environment of the autonomous vehicle 101. For example, for a particular object (e.g., a vehicle with a given speed, direction, turning angle, etc.), motion planning subsystem 124 decides whether to overtake, yield, stop, and/or pass based on, for example, traffic conditions, map data, state of the autonomous vehicle, etc. Furthermore, the motion planning subsystem also plans a path for the autonomous vehicle 101 to travel on a given route, as well as driving parameters (e.g., distance, speed, and/or turning angle). That is, for a given object, the motion planning subsystem 124 decides what to do with the object and determines how to do it. For example, for a given object, the motion planning subsystem 124 may decide to pass the object and may determine whether to pass on the left side or right side of the object (including motion parameters such as speed). Planning and control data is generated by the motion planning subsystem 124 that is transmitted to the vehicle control system 113 for execution.

Referring back to FIG. 1, the communications interface 114 may be configured to allow communication between autonomous vehicle 101 and external systems, such as, for example, external devices, sensors, other vehicles, servers, databases etc. Communications interface 114 may utilize any now or hereafter known protocols, protection schemes, encodings, formats, packaging, etc. such as, without limitation, Wi-Fi, an infrared link, Bluetooth, etc. User interface system 113 may be part of peripheral devices implemented within vehicle 101 including, for example, a keyword, a touch screen display device, a microphone, and a speaker, etc.

Figure 3:
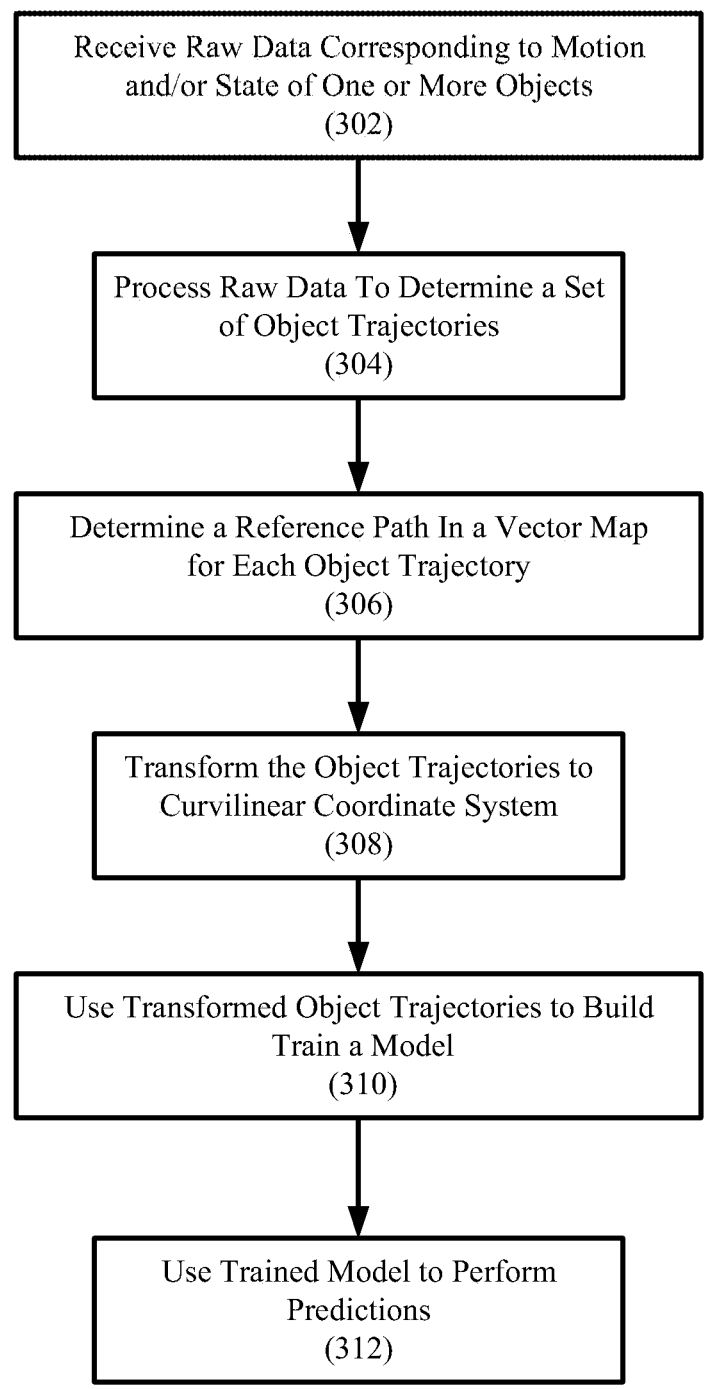
FIG. 3 illustrates a flowchart of an example method for training a neural network.

Referring now to FIG. 3, a flowchart corresponding to an example method for training a neural network for performing predictions and trajectory forecasting is illustrated. At step 302, raw data corresponding to the motion and/or state of one or more objects in one or more environments is received or collected from a library, human driving database, simulated data collection systems, real-time data corresponding to various scenarios and/or environments (e.g., data collected by information gathering devices installed in moving test vehicles being navigated through pre-defined routings in an environment or location of interest). The raw data may include, without limitation, traffic or vehicle image data, roadway data, environmental data, distance data from LIDAR or radar devices, data from which a position and velocity of neighboring vehicles in the vicinity of or proximate to the autonomous vehicle or host vehicle can be obtained or calculated, and/or other sensor information. The raw data may also include ground truth data. In certain embodiments, the raw data may be collected using, for example sensors such as LiDAR sensors, cameras, RADAR sensors, GPS devices, or the like.

For example, the raw data may include data corresponding to motion and/or state of objects captured in different seasons, weather conditions, locations, times of day, or the like. The scenarios can be represented, for example, by an occupancy grid, a collection of vehicle states on a map, or a graphical representation, such as a top-down image of one or more areas of interest. The raw data also includes data corresponding to the motion and/or status of the objects in different scenarios and different object actions, behaviors, and intentions in a context. For example, for predictions relating to the surrounding environment of an autonomous vehicle, the raw data includes data corresponding to motion and/or status of objects: at intersections, slowing for a turn, while making turns, during lane changes, accelerating before lane changes, stopping for pedestrians or road blocks, in various traffic conditions, for different types of objects (e.g., vehicles, bicycles, pedestrians, stationary objects, etc.).

In one or more embodiments, the raw data may be collected at various time intervals (e.g., sampling at 1 Hz-100 HZ, 10-90 Hz, 20-80 Hz, 30-70 Hz, 40-60 Hz, 1 Hz, 10 Hz, etc.) as time series sequences (e.g., 1 second, 5 seconds, 20 seconds, 50 seconds, etc.), and may include the corresponding time stamps. The raw data includes actual trajectories of objects under different scenarios and contexts.

At 304, the system may process the raw data to determine a set of object trajectories of one or more objects identified in the raw data ("object data set"). In certain embodiments, the object data does not include data corresponding to stationary objects. The system may process the raw data by, for example, to tracking the motion of one or more objects in the training data using any now or hereafter known tracking algorithms. For example, the system may track the motion of vehicles (static or moving) by first segmenting point clouds in the raw data into separate object instances or identifications (for example, using Mark R-CNN as pre-filtering followed by clustering the 3D LiDAR point clouds into separate objects according to density). The system may then track the identified objects as follows: given a sequence of F frames in the raw data, where each frame contains a set of 3D points collected using a LiDAR sensor $\{Pi|i=1, \ldots, N\}$, where $Pi \in R^3$ of x, y, z coordinates, the system may determine a set of track hypothesis: $\{T_j|j=1, \ldots, n\}$, where n is the number of unique objects in the whole sequence, and $T_j$ contains the set of object center locations (i.e., centroids) at frames f for f={fstart, . . . , fend} represents the range of frames where the object is visible. In certain embodiments, for tracking vehicles, the system may automatically discard data corresponding to non-driveable areas in the raw data set, map-based ground removal, lane direction information from a map (since vehicle direction rarely violates lane direction), or the like.

The object data set may therefore include, for each of one or more identified object, sequences of coordinates of centroids of tracked objects (i.e., object trajectories) over a pre-determined time length (e.g., 5 seconds) in a Cartesian coordinate system, and may be represented as a time series. For example, a trajectory $V_i$ at timestep t may be represented as a collection of coordinates $(x_i^t, v_i^t)$. The object data may be represented as time series for each identified At 306, the system may determine a reference path encoded in semantically rich vector maps for each object trajectory in the object data set. In certain embodiments, the reference paths may be the centerlines ("S") which correspond to the center of lanes extracted from a vector map. However, other reference paths are within the scope of this disclosure (e.g., reference paths learned based on historical data for different environments, scenarios, etc.). In certain embodiments, an object trajectory $V_i$ may be mapped to reference centerlines by obtaining a list of candidate reference paths by considering all centerlines in the neighborhood of the trajectory, and then filtering down the candidate reference paths by considering various factors. Example of such factors may include, without limitation, difference in object heading and centerline direction, offset (distance between trajectory and centerline), predecessor and/or successor centerlines aligned to the object trajectory. First we can get The reference path (e.g., centerline) may be a curvilinear line or it may be a series of linear segments which approximate a continuous curve. The reference paths as centerlines of this disclosure may be represented as "polylines", i.e. a sequence of straight segments on the vector map, where each straight segment is defined by 2 vertices: (x, y, z) start and (x, y, z) end. As such, curved lanes may be approximated with a set of straight lines.

The vector maps of the current disclosure may include semantic lane or data represented as a localized graph (instead of a graph rasterized into discrete samples) based on reference paths. The vector may include lane centerlines as reference paths within a lane because vehicle trajectories typically follow the center of a lane. Each lane centerline may split the corresponding lane into lane segments, where a lane segment is a segment of road where vehicle move in single-file fashion in a single direction. Multiple lane segments may occupy the same physical space (e.g. in an intersection). Furthermore, turning lanes which allow traffic to flow in either direction may be represented by two different lanes that occupy the same physical space.

For each lane centerline, the vector map may include one or more semantic attributes. The attributes may be included in the vector map as, for example, Boolean values that are not mutually inclusive. Examples of such semantic attributes may include, without limitation, information relating to whether a lane is located within an intersection, whether a lane has an associated traffic control measure, a lane's turn direction (left, right, or none), one or more unique identifiers for a lane's predecessors (lane segments that come before) the lane, one or more unique identifiers for a lane's successors (lane segments that come after), or the like.

In one or more embodiments, the system may obtain the vector maps corresponding to the object data from one or more databases and/or the vector maps may be stored locally on an autonomous vehicle.

Figure 4:
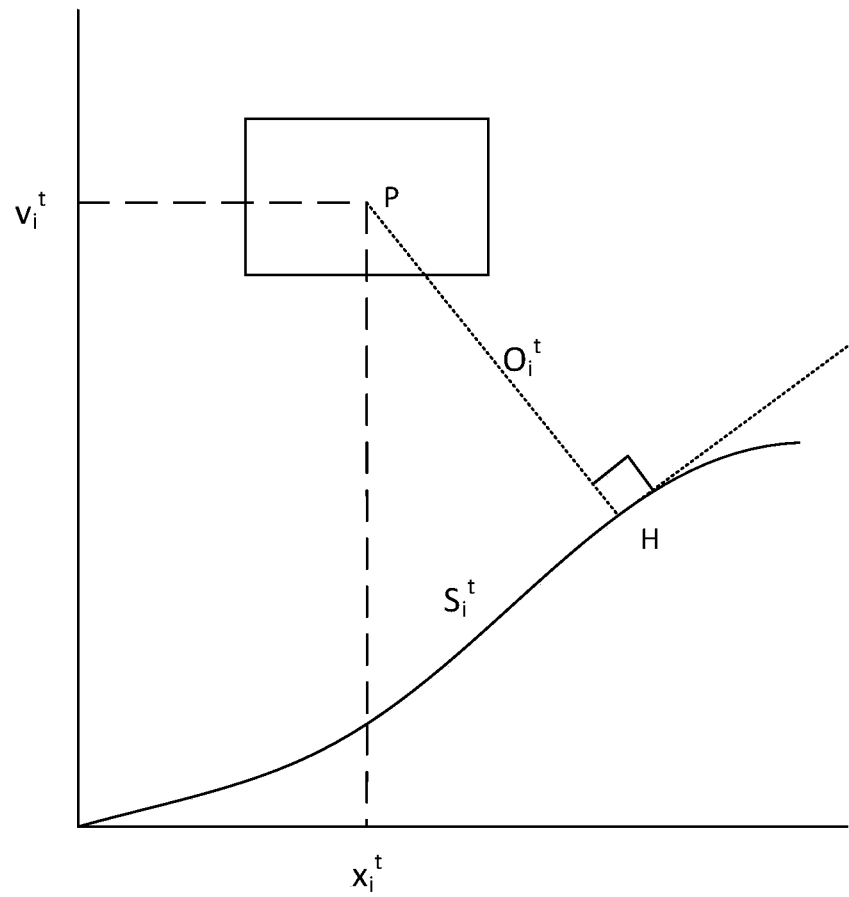
FIG. 4 illustrates an example curvilinear coordinate system.

At 308, the system may transform the object trajectories of the object data set into a 2D curvilinear coordinate system using the reference paths. In a 2D curvilinear coordinate system, a travel path through a multidimensional space connects an origination point with a destination point by means of a continuous curve. Therefore, the system may transform a trajectory Vi by mapping the $(x_i^t, v_i^t)$ coordinates of the trajectory along the centerline reference path ("S") as a function of distance along centerline $(S_i^t)$ and offset from the centerline $(O_i^t)$ as shown in FIG. 4. An example curvilinear coordinate system of the current disclosure is illustrated in FIG. 4 that includes curvilinear coordinates $(S_i^t, O_i^t)$ of trajectory Vi, that are representative of the trajectory's social and map features at time t. For transforming a Cartesian coordinate $(x_i^t, v_i^t)$ to a curvilinear coordinate $(S_i^t, O_i^t)$, the first step is to find point H on the centerline with the smallest distance to point P (vehicle position), and then computing the curvilinear abscissa $S_i^t$. With the use of the tangent at point H, the signed lateral distance $O_i^t$ can be derived to compute the curvilinear coordinates.

A trajectory $V_i$ at timestep t may be represented as a collection of curvilinear coordinates $(S_i^t, O_i^t)$ at different time stamps t=t1, t2, t3 . . . ti, and represents time series data. This data may be used to build and dynamically update models for performing predictions and forecasting as discussed below. Semantic attributes $M_i^t$ of the vector map may also be encoded in the trajectory Vi.

Transformation of the object data into the 2D curvilinear coordinate system allows the system to perform predictions and trajectory forecasting as deviations from the reference paths (instead of forecasting trajectories directly), which improves computational efficiency. Use of the reference paths also allows the system to combine and use information across physical spaces (e.g., across cities) as well as semantically different lane segments (e.g., intersections and turns), leading to improved prediction and forecasting accuracy. Accuracy and efficiency is also improved because the underlying lane segments, such as width and curvature, are encoded as input features of the vector map rather than space (or substrate) for the predictions themselves. Furthermore, since the transformed trajectories include a series of normal and tangential coordinates with respect to the reference path, behavior of the vehicles (or objects) may be analyzed in relation to the behavior of other vehicles. For example, examples of left turns may be encoded and utilized to understand the behavior of a car going proceeding straight (and vice-versa). Finally, performing predictions as constrained to the references paths eliminate the possibility of impractical predictions such as those that relate to a vehicle traveling out of its lane, crashing into an opposite lane, driving into restricted areas, or the like.

In certain embodiments, social context may $C_i^t$ of the object trajectories may also be computed from the raw trajectories in the object data set. Such social context may include information relating to, for example, minimum distance to the objects in front of the tracked object, at the back of the tracked object, the number of neighbors, behavior of other objects, or the like. Thus, a trajectory $V_i$ at timestep t may be represented as a collection of curvilinear coordinates $(S_i^t, O_i^t, C_i^t)$ at different time stamps t=t1, t2, t3 . . . ti.

At 310, the system may use at least a portion of the transformed object trajectories to build, train and/or configure a model for generating predicted vehicle and/or object trajectories given a current context and the trained model. Because the model is trained using real world, human behavior data, the predicted behavior and trajectories of vehicles or objects produced by the model are closely correlated to the actual behavior and trajectories of vehicles in real world environments with human drivers.

In certain embodiments the model may include a feedback system such as a recurrent neural network (RNN) (e.g., neural network 123(a) of FIG. 2). RNNS can be utilized to perform predictions due to the relative ease with which they can be deployed to model complex relationships and their ability to retain a potentially arbitrarily long history of an input signal. The RNN can model a complex relationship between the inputs and outputs of a sequence of temporal signals with a plurality of nodes. Each node performs a relatively simple data transformation on a single dimension, i.e., an activation function, such as a hyperbolic tangent, as compared to modeling the entire relationship. The activation function may take on a various forms including, without limitation, linear functions, step functions, ramp functions, sigmoid functions and Gaussian functions.

Figure 5:
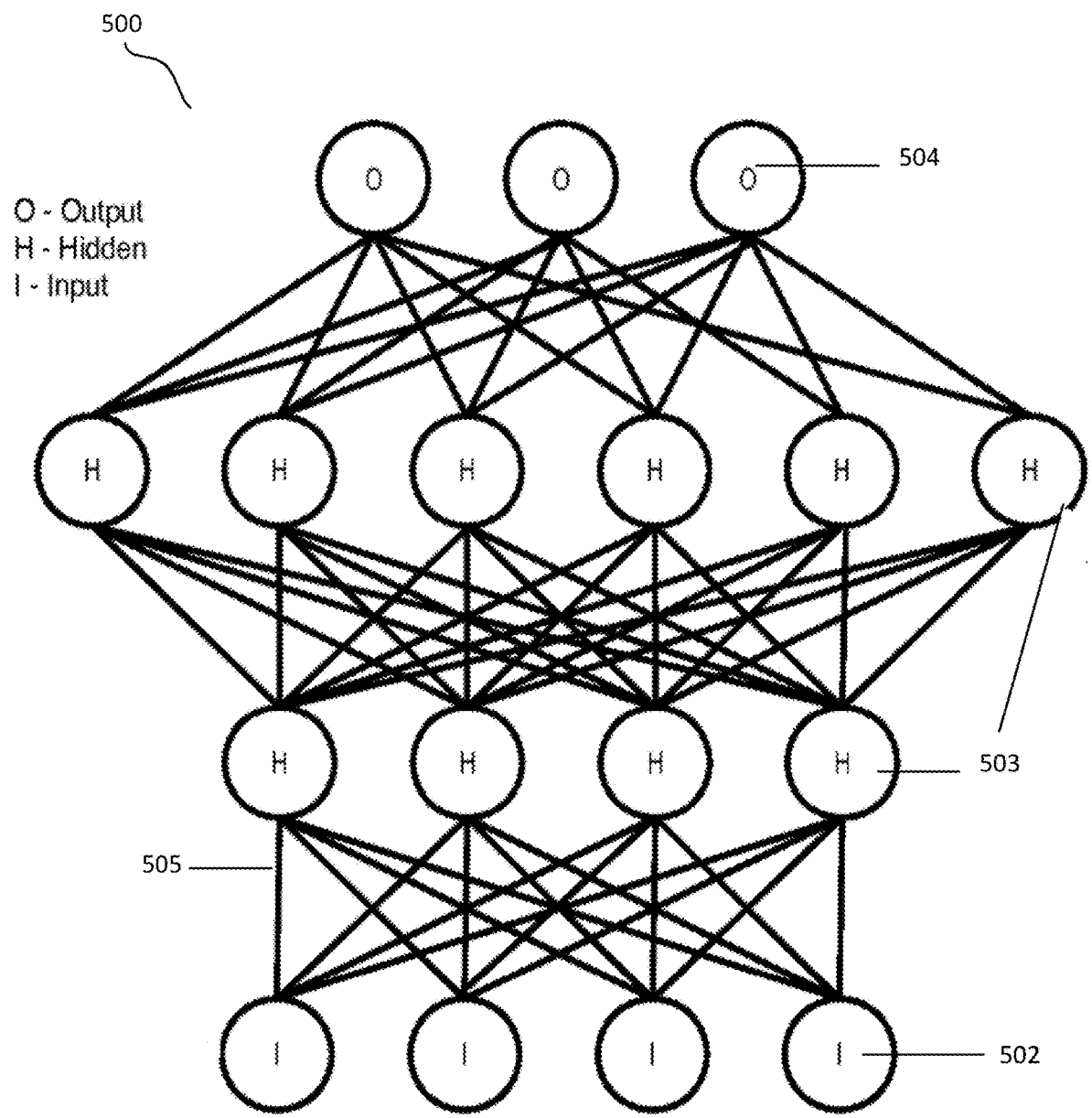
FIG. 5 illustrates a schematic diagram of an example neural network.

The RNN's ability to retain a history of an input signal comes from the arrangement of the dependencies between the nodes and/or layers (horizontal collection of nodes) that perform the activation functions. The nodes may be arranged in a feed forward manner where the output of an earlier layer is the input for the subsequent layer. Thus, each layer of nodes may be dependent from the previous layer of nodes. The nodes may also be recurrent, i.e, dependent from the input of output of any of the nodes from an earlier portion of a temporal sequence. Therefore, an output of the RNN can be dependent upon the output of a plurality of interconnected nodes rather than a single transformation. A deep neural network includes multiple hidden layers in the network hierarchy. Referring to FIG. 5, a deep neural network 500 comprises a plurality of nodes, including input nodes (I) 502, hidden nodes (H) 503 and output nodes (O) 504. The nodes can be connected by edges, e.g., 505, which can be weighted according to the strength of the edges. It should be understood that deep neural networks typically have four or more hidden layers, and that FIG. 5 is merely an example used for describing exemplary embodiments. It is noted that embodiments of the present disclosure may comprise an RNN of any order of complexity, and are not limited to the relative simple RNNs which are shown and described herein for descriptive purposes. For example, an RNN may have any number of layers, nodes, trainable parameters (also known as weights) and/or recurrences.

An example of an RNN used in the current disclosure is a long short-term memory (LSTM) neural network that includes one or more LSTM memory blocks. LSTM's enable RNNs to remember their inputs over a long period of time. Each LSTM memory block can include one or more cells that each include an input gate, a forget gate, and an output gate that allow the cell to store previous states for the cell, e.g., for use in generating a current activation or to be provided to other components of the LSTM neural network. Since LSTMs incorporate memory cells that explicitly allow the network to learn when to "forget" previous hidden states and when to update hidden states given new information, they may be utilized for sequences or temporally based data. However, other types of RNNs such as gated recurrent units (GRU), vanilla RNNs, or the like within the scope of this disclosure. The number of hidden layers and their size may be determined based on the type and dimensionality of input data. For example, non-image data may require a lesser number (e.g., 1-2 hidden layers with size 30-34) of hidden layers compared to when the data includes entire images as input.

The process of organizing the interconnections between the nodes that perform relatively simple transformations is called training. Once the nodes are organized and properly trained the RNN can solve a complex problem with a composition of transformations performed in a sequence defined by the structure of the nodes. The RNN may be trained using an optimizer, an unsupervised learning algorithm, an evolutionary algorithm, sequential target replication, and the like on a training sequence that comprises inputs and the correlated outputs. An RNN enables inferences based on the trends of multiple correlated variables without any assumption on their probability distribution. To do so, RNN learns during training what matters and what doesn't in these trends over large amounts of data.

As discussed above, the transformed object data includes trajectory sequences in the curvilinear coordinate system as time series data. The RNN is first configured to perform the task: given the past input coordinates of a vehicle trajectory Vi as Xi=$(x_i^t, y_i^t)$ for time steps t={1, . . . , Tobs}, predict the future coordinates Yi=$(x_i^t, y_i^t)$ for time steps {t=Tobs+1, . . . , Tpred}. Next, to train the RNN, the transformed object data including the trajectory sequences may be split into a training data set and a test data. Data may be divided into training and test data set based on time, geography, or any other parameters.

The RNN is developed and dynamically updated (i.e., validation error reduced) using the training data set and is then evaluated using the test data set. During training, a part of the training data set may be used to continuously and dynamically update various iterations of the RNN model. The RNN model learns to infer a sequence of future values (called "horizon") based on a given lag by learning over multiple pairs of lag-horizon taken across the available timeline. The model may be trained and validated by iterating through the whole training dataset of trajectory sequences based on pre-set number of epochs (e.g., about 50 to about 750 epochs). For example, the model may be trained for a desired number of epochs, and then checked for an error metric by calculating a cost function (such as Mean Squared Error (MSE) score, Average Displacement Error (ADE) and Final Displacement Error (FDE)). If the cost function is not satisfactory (i.e., the error metric is high), the hyperparameters of the model (e.g., learning rate and number of epochs) are tuned and the model is trained again to reduce the error metric. When a satisfactory (or as expected) cost function is achieved, the training process of the algorithm terminates (i.e., when the error metric starts increasing instead of decreasing).

Training of the RNN in the current disclosure is performed over a short initial horizon followed by longer rolling horizons such that the trajectory of an object over the course of several seconds is determined based on both inertial constraints of the object and behavioral decisions of the object. The inertial constraints typically influence the motion and/or status of an object on a very short timescale (e.g., about 0.1 to about 1 second) and thus affect the short-term dynamics of the object. The horizon may be slowly increased during each training cycle to be for example, 0.1 second, 0.2 second, 0.3 second, 0.4 second, 0.5 second, 0.6 second, 0.7 second, 0.8 second, 0.9 second, 1 second; 0.1 second, 0.3 second, 0.5 second, and 1 second, or the like. The behavioral decisions of an object, however, typically influence the motion and/or status of the object on a longer timescale (e.g., about 1.5 to about 5 seconds) and thus affect the long-term dynamics of the object. The horizon may be slowly increased during each training cycle to be for example, 1.5 seconds, 1.7 seconds, 2.1 seconds, 2.4 seconds, 2.7 seconds, 3 seconds, 3.5 seconds, 4 seconds, 4.5 second, 5 seconds; 1.5 seconds, 2 seconds, 2.5 seconds, and 3 seconds, or the like. The two step training of this disclosure may include training the same policy class of the neural network at different time scales to capture both the short-term and long-term dynamics of the objects.

In the first training step, the RNN model is used to predict trajectories of objects for shorter time horizons (e.g., less than 1 second such as 100 ms, 200 ms, 500 ms, etc.) and is configured as an inertial constraints RNN. This single step rollout functionally initializes the RNN to produce constant velocity predictions. In other words, through this initial regression task, the RNN is encoded for taking into short-timescale inertial constraints (i.e., physical constraints of objects) inherent in performing trajectory predictions and forecasting.

In the next training step, the system slowly extends the prediction horizon in a rolling manner to update the inertial constraints RNN. For example, the RNN may predict trajectories of objects for progressively longer durations (e.g., 1 second, 1.5 seconds, 2 seconds, 5 seconds, 10 seconds, and so on . . . ), and for each horizon the model may be trained and tested by iterating through the whole training dataset based on a pre-set number of epochs and/or until a satisfactory cost function value is achieved. Extending the roll-out horizon in such a manner allows the RNN to encode long-term behavioral decisions of objects in addition to the already encoded or retained short-term inertial constraints.

In certain embodiments, the horizon may be rolled out from about 1 second to about 5 seconds, from about 2 seconds to about 4 seconds, from about 1.5 seconds to about 3.5 seconds, from about 1.5 seconds to about 2 seconds, or the like. The set of intermediate rollout horizons, as well as the ultimate rollout horizon, may be determined using cross-validation hyperparameter tuning.

As a result, the RNN may be trained and configured to perform state and trajectory prediction for one or more objects in the environment of an autonomous vehicle and/or the autonomous vehicle itself based on the state predictions of surrounding objects.

At 312, the final trained RNN model may be used to perform predictions based on both inertial constraints as well as behavioral constraints of an object during the operation of the autonomous vehicle. Such predictions may include predicting future trajectories of an object and/or the autonomous vehicle. The predictions may be performed at the ultimate rollout horizon timestamps of the trained model (e.g., 3 seconds) conditioned on a data set including the observed trajectory of the objects and centerline of the observed trajectory.

Figure 6A:
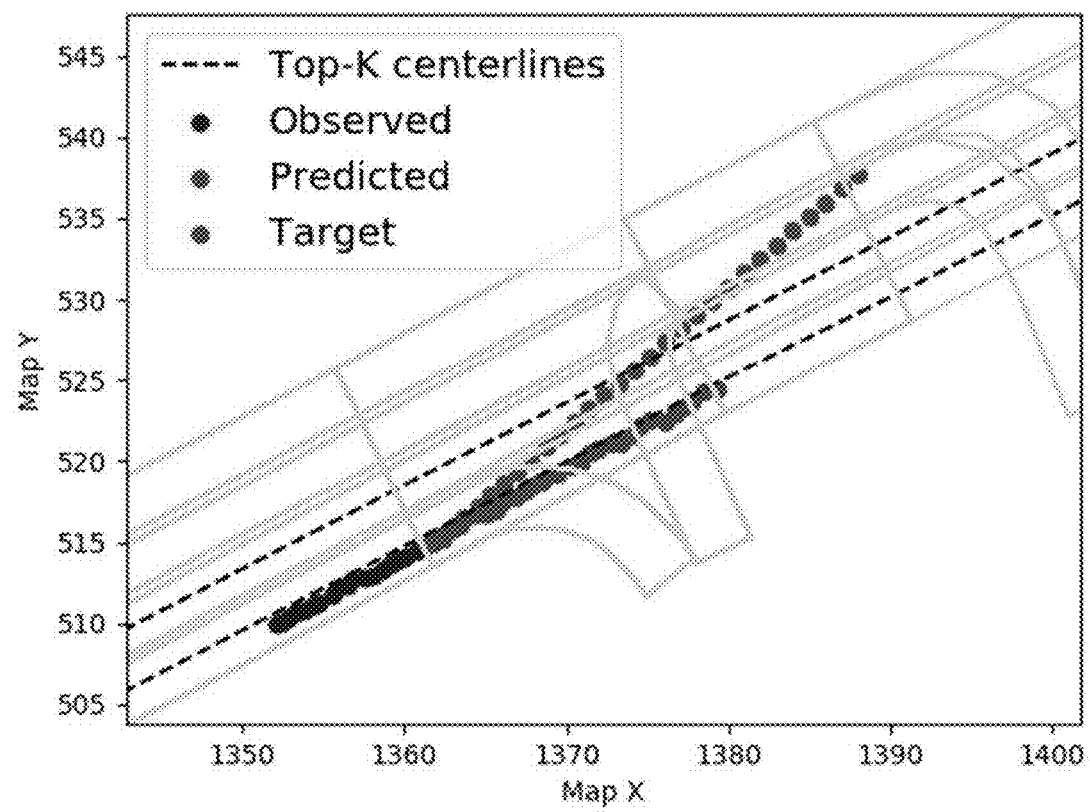
FIGS. 6A and 6B illustrate the effect of a rollout prediction horizon for training a trajectory prediction model of an autonomous vehicle.
Figure 6B:
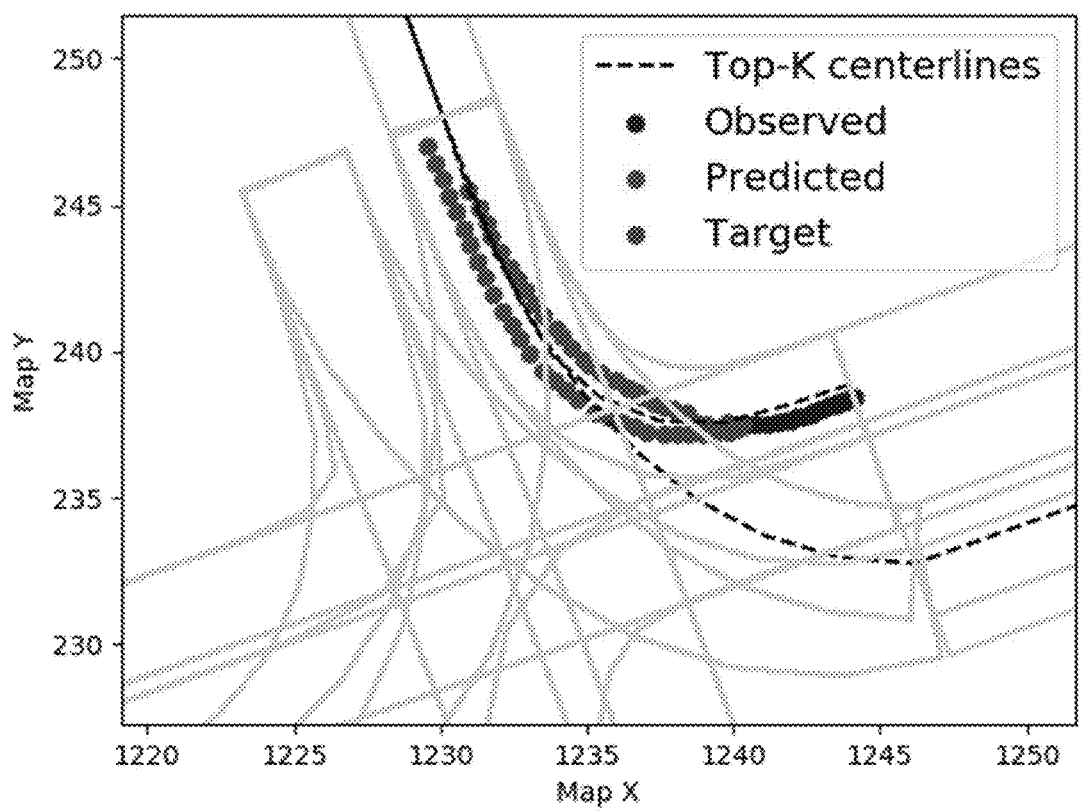

FIGS. 6A and 6B are graphical illustrations that show the effects of performing trajectory predictions using the RNN models as described above. FIG. 6A illustrates predictions performed using a model that is trained to predict trajectories for shorter time horizons (0.1 secs), while FIG. 6B illustrates performed using a model that is trained to predict trajectories for longer inertial behavioral rollout up to 30 time horizons (3 secs) in the future, as discussed above. The blue path in each figure corresponds to the 2 seconds of observed trajectory, the red path is for the trajectory corresponds to path predicted for the next 3 secs, and the green path corresponds to the actual trajectory followed by an AV in those 3 seconds. As shown in FIG. 2A, when the rollout is shorter time horizons (0.1 secs), the model learns the kinematic constraints (as evident from the smooth trajectory of the AV) only and not the higher level behavioral decisions (as evident from the AV not staying in the lane). However, when the rollout is 30, as shown in FIG. 6B, the model builds on the short term kinematic constraints and eventually learns some higher lever understanding on how to cross an intersection, stay in the lane, making turns without crossing lane boundaries, or the like.

Figure 7:
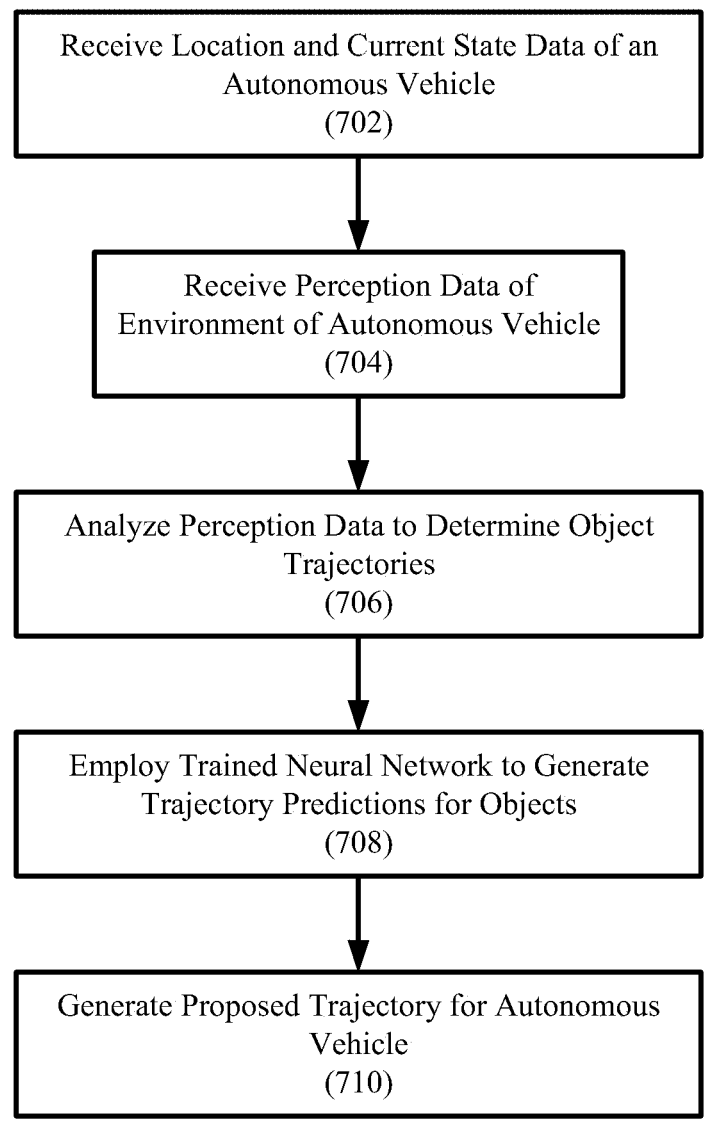
FIG. 7 illustrates a flowchart of an example method for performing trajectory predictions using a trained neural network.

FIG. 7 illustrates a flowchart for an example method for performing predictions and trajectory forecasting. At 702, the system receives location and current state data corresponding to an autonomous vehicle. The location data can include sensor data from sensors (e.g., cameras, LIDAR, radar, etc.) mounted on or used in connection with the autonomous vehicle. At 704, the system may also receive perception data including identification of objects (e.g., vehicles) and their corresponding states in the environment of the autonomous vehicle (e.g., velocity, acceleration, location, heading, orientation, or the like). At 706, the system may analyze the perception data corresponding to each object in the environment of the autonomous vehicle to determine object trajectories Vi over time stamp t in the curvilinear coordinate system, as discussed above. In certain embodiments, the trajectories also encode map context information and social context information of the objects. The system may then employ the trained RNN model (or any other machine learning components) to generate (708) trajectory predictions for each object relative to the autonomous vehicle. Such trajectory predictions take into account both inertial and behavioral parameters of each object. Based on the trajectory predictions of the objects in the surrounding environment of the autonomous vehicle as well as the location data of the autonomous vehicle, the system may also generate a planned trajectory (710) for the autonomous vehicle itself. For example, the trained RNN may determine that a particular proximate vehicle is likely to execute a lane change maneuver into the lane of autonomous vehicle and in front of the autonomous vehicle. The system may, therefore, generate a planned trajectory for the autonomous vehicle that avoid collision with the proximate vehicle (e.g., slowing down, moving into a different lane, etc.).

Figure 8:
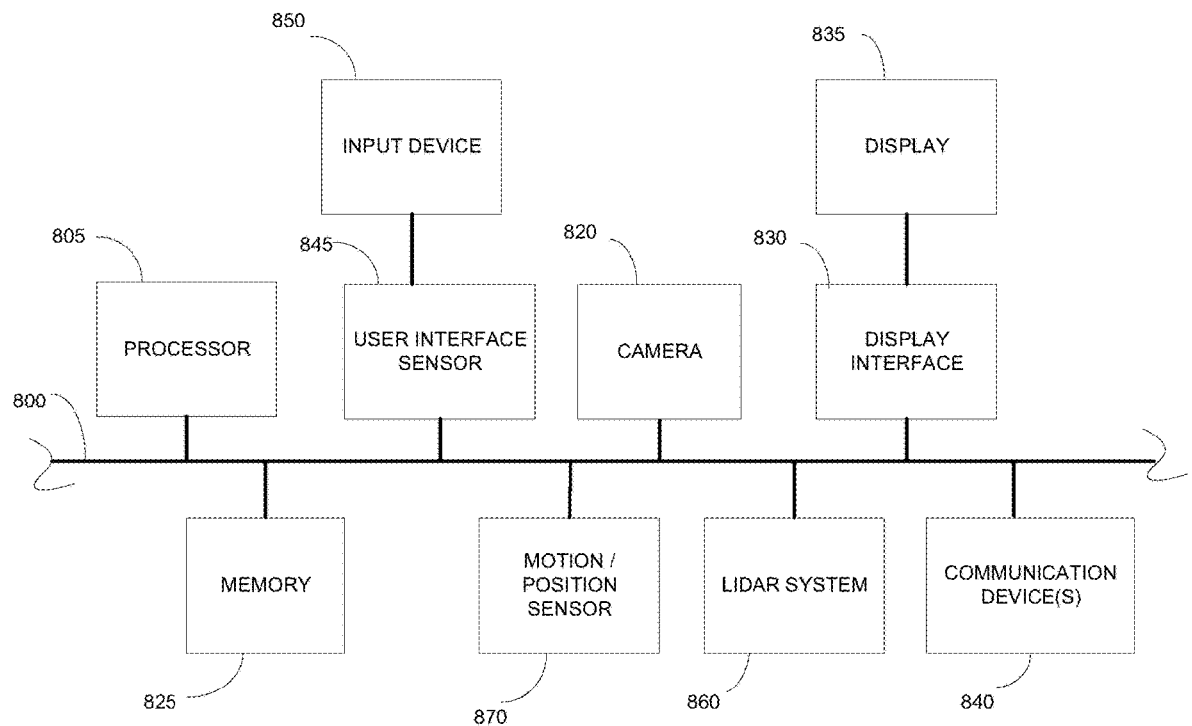
FIG. 8 is a block diagram of elements of a computing device on which the various systems and methods in this document could be implemented.

FIG. 8 depicts an example of internal hardware that may be included in any of the electronic components of the system, such as the controller (or components of the controller) of the autonomous vehicle, the control system, servers etc. described above. An electrical bus 800 serves as an information highway interconnecting the other illustrated components of the hardware. Processor 805 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 825. A memory device may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 830 may permit information from the bus 800 to be displayed on a display device 835 in visual, graphic or alphanumeric format. An audio interface and audio output (such as a speaker) also may be provided. Communication with external devices may occur using various communication devices 840 such as a wireless antenna, an RFID tag and/or short-range or near-field communication transceiver, each of which may optionally communicatively connect with other components of the device via one or more communication system. The communication device(s) 840 may be configured to be communicatively connected to a communications network, such as the Internet, a local area network or a cellular telephone data network.

The hardware may also include a user interface sensor 845 that allows for receipt of data from input devices 850 such as a keyboard, a mouse, a joystick, a touchscreen, a touch pad, a remote control, a pointing device and/or microphone. Digital image frames also may be received from a camera 820 that can capture video and/or still images. The system also may receive data from a motion and/or position sensor 870 such as an accelerometer, gyroscope or inertial measurement unit. The system also may receive data from a LiDAR system 860 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

It should be noted that while the training of the neural network model and using the trained model in this disclosure is described with respect to autonomous vehicles and objects in the environments of the autonomous vehicles, the disclosure is not so limiting. The rolling horizon training methods described above may be used for training neural networks for use in other scenarios that are constrained by inertial parameters that represent short-term dynamics of an object. Examples may include neural network models configured for making predictions relating to movement of players and/or objects such as balls in a sports environment; or any other system or environment that is both constrained by physics and involves behavioral choice.

Terminology that is relevant to the disclosure provided above includes;

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" or AV is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. The autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft).

In this document, when terms such "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The invention claimed is:

1. A method comprising:
   receiving a first set of data, wherein the first set of data comprises time series information corresponding to states of a plurality of objects;
   analyzing the first set of data to determine a plurality of object trajectory sequences corresponding to each of the plurality of objects; and
   using one or more of the plurality of object trajectory sequences as input to train a prediction model for predicting future trajectories of the plurality of objects by:
      defining a first prediction horizon,
      training the prediction model over the first prediction horizon to generate a semi-trained prediction model,
      defining a second prediction horizon that is longer than the first prediction horizon, and
      training, using the second prediction horizon, the semi-trained prediction model to generate a trained prediction model.

2. The method of claim 1, further comprising using the trained prediction model to predict future trajectories of one or more objects based on observed states of the one or more objects.

3. The method of claim 1, further comprising generating a planned trajectory for an autonomous vehicle by:
   receiving state data corresponding to the autonomous vehicle;
   receiving perception data corresponding to one or more objects in an environment of the autonomous vehicle;
   inputting the perception data into the trained prediction model to predict future trajectories of the one or more objects; and
   inputting the state data corresponding to the autonomous vehicle and each of the predicted future trajectories into the trained prediction model to generate the planned trajectory for the autonomous vehicle.

4. The method of claim 1, further comprising using the one or more of the plurality of object trajectory sequences as input to train the prediction model for predicting future trajectories of the plurality of objects by:
   defining a third prediction horizon that is longer that the second prediction horizon; and
   training, using the third prediction horizon, the trained prediction model to generate an updated trained prediction model.

5. The method of claim 1, wherein the first prediction horizon is determined to encode one or more inertial constraints for predicting future trajectories of the plurality of objects.

6. The method of claim 5, wherein the first prediction horizon is less than 1 second.

7. The method of claim 5, wherein the second prediction horizon is determined to encode one or more behavioral constraints for predicting future trajectories of the plurality of objects.

8. The method of claim 7, wherein the second prediction horizon is about 2 seconds to about 10 seconds.

9. The method of claim 1, further comprising:
   determining, for each of the plurality of object trajectory sequences, a reference path; and
   transforming each of the plurality of object trajectory sequences into a curvilinear coordinate system with respect to the corresponding reference path.

10. The method of claim 9, wherein the reference path is encoded in a vector map that comprises information corresponding to a plurality of semantic attributes.

11. The method of claim 10, wherein information corresponding to the plurality of semantic attributes comprises at least one of the following: information relating to whether a lane is located within an intersection, information relating to whether a lane has an associated traffic control measure, a lane's turn direction, one or more unique identifiers for a lane's predecessors, or one or more unique identifiers for a lane's successors.

12. The method of claim 9, wherein the reference path is a centerline of a lane.

13. The method of claim 1, further comprising encoding social context information of each of the plurality of objects into the corresponding object trajectory.

14. The method of claim 13, wherein the social context information of each of the plurality of objects comprises at least one of the following: minimum distance to one or more objects in front of that object, minimum distance to one or more objects behind that object, or a number of neighboring objects.

15. The method of claim 1, wherein the prediction model is a recurrent neural network (RNN).

16. A system comprising:
   an autonomous vehicle comprising one or more sensors;
   a processor; and
   a non-transitory computer readable medium comprising one or more programming instructions that when executed by the processor, cause the processor to:
      receive a first set of data, wherein the first set of data comprises time series information corresponding to states of a plurality of objects,
      analyze the first set of data to determine a plurality of object trajectory sequences corresponding to each of the plurality of objects, and
      use one or more of the plurality of object trajectory sequences as input to train a prediction model for predicting future trajectories of the plurality of objects by:
         defining a first prediction horizon,
         training the prediction model over the first prediction horizon to generate a semi-trained prediction model,
         defining a second prediction horizon that is longer than the first prediction horizon, and
         training, using the second prediction horizon, the semi-trained prediction model to generate a trained prediction model.

17. The system of claim 16, further comprising programming instructions that when executed by the processor, cause the processor to use the trained prediction model to predict future trajectories of one or more objects in an environment of the autonomous vehicle based on observed states of the one or more objects.

18. The system of claim 16, further comprising programming instructions that when executed by the processor, cause the processor to generate a planned trajectory for the autonomous vehicle by:
receiving state data corresponding to the autonomous vehicle;
receiving perception data corresponding to one or more objects in an environment of the autonomous vehicle;
inputting the perception data into the trained prediction model to predict future trajectories of the one or more objects; and
inputting the state data corresponding to the autonomous vehicle and each of the predicted future trajectories into the trained prediction model to generate the planned trajectory for the autonomous vehicle.

19. The system of claim 16, further programming instructions that when executed by the processor, cause the processor to use the one or more of the plurality of object trajectory sequences as input to train the prediction model for predicting future trajectories of the plurality of objects by:
defining a third prediction horizon that is longer that the second prediction horizon; and
training, using the third prediction horizon, the trained prediction model to generate an updated trained prediction model.

20. The system of claim 16, wherein the first prediction horizon is determined to encode one or more inertial constraints for predicting future trajectories of the plurality of objects.

21. The system of claim 20, wherein the first prediction horizon is less than 1 second.

22. The system of claim 20, wherein the second prediction horizon is determined to encode one or more behavioral constraints for predicting future trajectories of the plurality of objects.

23. The system of claim 22, wherein the second prediction horizon is about 2 seconds to about 10 seconds.

24. The system of claim 16, further comprising programming instructions that when executed cause the processor to:
determine, for each of the plurality of object trajectory sequences, a reference path; and
transform each of the plurality of object trajectory sequences into a curvilinear coordinate system with respect to the corresponding reference path.

25. The system of claim 24, wherein the reference path is encoded in a vector map that comprises information corresponding to a plurality of semantic attributes.

26. The system of claim 25, wherein information corresponding to the plurality of semantic attributes comprises at least one of the following: information relating to whether a lane is located within an intersection, information relating to whether a lane has an associated traffic control measure, a lane's turn direction, one or more unique identifiers for a lane's predecessors, or one or more unique identifiers for a lane's successors.

27. The system of claim 26, wherein the reference path is a centerline of a lane.

28. The system of claim 16, further comprising programming instructions that when executed cause the processor to: encode social context information of each of the plurality of objects into the corresponding object trajectory.

29. The system of claim 28, wherein the social context information of each of the plurality of objects comprises at least one of the following: minimum distance to one or more objects in front of that object, minimum distance to one or more objects behind that object, or a number of neighboring objects.

30. The system of claim 16, wherein the prediction model is a recurrent neural network (RNN).

* * * * *